United States Patent
Lee et al.

(10) Patent No.: US 7,609,860 B2
(45) Date of Patent: Oct. 27, 2009

(54) BILINEAR ILLUMINATION MODEL FOR ROBUST FACE RECOGNITION

(75) Inventors: Jinho Lee, Belmont, MA (US); Baback Moghaddam, Cambridge, MA (US); Hanspeter Pfister, Arlington, MA (US); Raghu Machiraju, Dublin, OH (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 788 days.

(21) Appl. No.: 11/251,222

(22) Filed: Oct. 14, 2005

(65) Prior Publication Data

US 2006/0280343 A1 Dec. 14, 2006

Related U.S. Application Data

(63) Continuation-in-part of application No. 11/152,528, filed on Jun. 14, 2005.

(51) Int. Cl.
*G06K 9/00* (2006.01)
*G06K 9/46* (2006.01)
*G06K 9/66* (2006.01)
*G06K 9/36* (2006.01)
*A61B 3/10* (2006.01)

(52) U.S. Cl. ................... 382/118; 382/115; 382/190; 382/285; 351/204

(58) Field of Classification Search ............ 382/118, 382/190, 285
See application file for complete search history.

(56) References Cited

U.S. PATENT DOCUMENTS

| 6,160,907 A * | 12/2000 | Robotham et al. ........ 382/154 |
| 6,803,910 B2 * | 10/2004 | Pfister et al. .............. 345/420 |
| 7,110,593 B2 * | 9/2006 | Katagiri et al. ........... 382/154 |
| 2008/0247608 A1 * | 10/2008 | Vasilescu et al. ......... 382/118 |

OTHER PUBLICATIONS

Vasilescu et al., "Multilinear Analysis of Image Ensembles: TensorFaces", Proc. of the European Conf. on Computer Vision (ECCV' 02), Copenhagen, Denmark, May 2002, pp. 447-460.*
The NIST Face Recognition Grand Challenge (http://www.frvt.org/FRGC/).
R. Basri and D. Jacobs. Lambertian reflectance and linear subspace. *IEEE Transaction on Pattern Analysis and Machine Intelligence*, 25(2):218-233, 2003.
V. Blanz and T. Vetter. Face recognition based on fitting a 3D morphable model. *IEEE Transactions on Pattern Analysis and Machine Intelligence*, 25(9):1063-1074, 2003.

(Continued)

*Primary Examiner*—Brian P Werner
*Assistant Examiner*—Jose M Torres
(74) *Attorney, Agent, or Firm*—Dirk Brinkman; Gene Vinokur

(57) ABSTRACT

A method recognizes a face in an image. A morphable model having shape and pose parameters is fitted to a face in an image to construct a three-dimensional model of the face. Texture is extracted from the face in the image using the three-dimensional model. The shape and texture are projected into a bilinear illumination model to generate illumination bases for the face in the image. The illumination bases for the face in the image are compared to illumination bases of each of a plurality of bilinear illumination models of known faces to identify the face in the image.

7 Claims, 7 Drawing Sheets

OTHER PUBLICATIONS

K. I. Chang, K. Bowyer, and P. Flynn. Face recognition using 2D and 3D facial data. In *Multimodal User Authentication Workshop*, 2003.

W. Freeman and J. Tennenbaum. Learning bilinear models for two-factor problems in vision. In *Proc. of Computer Vision & Pattern Recognition*, pp. I:19-25, 1997.

A. S. Georghiades, P. N. Belhumeur, and D. J. Kriegman. From few to many: Illumination cone models for face recognition under variable lighting and pose. *IEEE Transactions on Pattern Analysis and Machine Intelligence*, 23(6):643-660, 2001.

J. Huang, B. Heisele, and V. Blanz. Component-based face recognition with 3D morphable models. In *Proc. of the 4th Int'l Conf. On Audio- and Video-Based Biometric Person Authenticitation Surrey*, 2003.

L. D. Lathauwer, B. D. Moor, and J. Vandewalle. A multilinear singular value decomposition. *SIAM Journal of Matrix Analysis and Applications*, 21(4), 2000.

J. Lee, R. Machiraju, H. Pfister, and B. Moghaddam. Estimation of 3D faces and illumination from a single photograph using a bilinear illumination model. In *Proc. of Eurographics Symposium on Rendering*, 2005.

K. Lee, J. Ho, and D. Kriegman. Nine points of light: Acquiring subspaces for face recognition under variable lighting. In *Proc. of Computer Vision&Pattern Recognition*, vol. 1, pp. 519-526, 2001.

B. Moghaddam, J. Lee, H. Pfister, and R. Machiraju. Modelbased 3D face capture with shape-from-silhouettes. In *Proc. of Advanced Modeling of Faces & Gestures*, 2004.

S. Romdhani, V. Blanz, and T. Vetter. Face identification by fitting a 3d morphable model using linear shape and texture error functions. In *European Conference on Computer Vision*, pp. 3-19, 2002.

T. Sim, S. Baker, and M. Bsat. The cmu pose, illumination, and expression (pie) database. In *Proc. Int'l Conf. Automatic Face & Gesture Recognition*, pp. 53-58, 2002.

M. A. O. Vasilescu and D. Terzopoulos. Multilinear subspace analysis of image ensembles. In *Proc. of Computer Vision & Pattern Recognition*, 2003.

L. Zhang and D. Samaras. Face recognition under variable lighting using harmonic image exemplars. In *Proc. Computer Vision & Pattern Recognition*, pp. I:19-25, 2003.

\* cited by examiner

BILINEAR ILLUMINATION MODEL FOR ROBUST FACE RECOGNITION

RELATED APPLICATION

This is a Continuation-in-Part of U.S. patent application Ser. No. 11/152,528, Lee et al., "Method and System for Generating Bilinear Models for Faces," filed on Jun. 14, 2005.

FIELD OF THE INVENTION

This invention relates generally to computer vision, and more particularly to recognizing faces in images.

BACKGROUND OF THE INVENTION

The performance of a face recognition system is adversely affected by changes in facial appearance due to lighting and pose variation. One prevalent trend is to exploit 3D shape information of human faces to overcome the limitation of traditional 2D images. The 3D shape information can be obtained directly from a range scanner or estimated from one or more images. Although the cost of acquiring 3D geometric data is decreasing, most existing face databases only include single 2D images. Therefore, it is more practical to obtain 3D shape from a single 2D image than from multiple image or range data.

Currently, there are three different techniques that use 3D shape information for face recognition. First, using 3D shape directly as a pose/illumination independent signature. Second, using 3D data to generate synthetic imagery under various viewpoints and lighting conditions in order to generate a pose/illumination invariant representation in 2D image space. Third, using 3D shape to derive an analytic illumination subspace of a Lambertian object with spherical harmonics.

For example, the first approach is typified by Morphable Models, V. Blanz and T. Vetter, "Face recognition based on fitting a 3D morphable model," *IEEE Transactions on Pattern Analysis and Machine Intelligence,* 25(9):1063-1074, 2003. They obtain the 3D shape and 2D texture of a face from a single image to construct a model. The models for a probe and a gallery image are matched directly based on their respective principle component analysis (PCA) coefficients. That technique handles variable pose and lighting. However, the technique requires careful manual initialization of facial landmarks and uses an iterative non-linear optimization technique for fitting, which can take several minutes to converge, if at all, and then only to a local minimum. Thus, it is not certain whether that face capture/modeling approach can be used for real-time face recognition.

The second and third techniques are qualitatively different, and are related to a popular recognition paradigm of "distance-from-a-subspace" which dates back to early work on 2D appearance-based modeling. Although those two approaches can also use 3D morphable models, it is mostly in the form of a tool for subsequent invariant modeling and subspace generation, as opposed to the final choice of representation for recognition.

Several methods are known for generating a linear subspace to acquire the illumination variations of a face. One method uses photometric stereo images to reconstruct 3D face geometry and albedo from seven frontal images under different illuminations, A. S. Georghiades, P. N. Belhumeur, and D. J. Kriegman, "From few to many: Illumination cone models for face recognition under variable lighting and pose," *IEEE Transactions on Pattern Analysis and Machine Intelligence,* 23(6):643-660, 2001. The estimated 3D face can then be used to render synthetic images from various poses and lighting conditions to train a person specific illumination cone.

Another method uses a similar "short-cut", R. Basri and D. Jacobs, "Lambertian reflectance and linear subspace," *IEEE Transaction on Pattern Analysis and Machine Intelligence,* 25(2):218-233, 2003. They state that the arbitrary illumination of a convex Lambertian 3D object should be approximated by a low dimensional linear subspace spanned by nine harmonic images. The nine harmonic images can be determined analytically given surface normals and the albedo.

A more practical variation is decribed by K. Lee, J. Ho, and D. Kriegman, "Nine points of light: Acquiring subspaces for face recognition under variable lighting," *Proc. of Computer Vision & Pattern Recognition,* volume 1, pages 519-526, 2001. They empirically determine nine directions of a point source with which to approximate the span of the nine harmonic images. These nine images are adequate for face recognition, and do not require 3D shape, e.g., surface normals and albedo. However, it is not always practical to acquire nine images of every face in a real operational setting.

Another method estimates the nine harmonic images from a single image, L. Zhang and D. Samaras, "Face recognition under variable lighting using harmonic image exemplars," *Proc. Computer Vision & Pattern Recognition,* pages I:19-25, 2003. However, the face is neither exactly Lambertian nor entirely convex. Therefore, spherical harmonics have an inherent limitation, especially when dealing with specularities, cast shadows, inter-reflections and subsurface scattering. They also require a 'bootstrap' dataset.

SUMMARY OF THE INVENTION

The invention generates an illumination subspace for arbitrary 3D faces based on the statistics of measured illuminations under variable lighting conditions from many subjects. A bilinear model based on the higher order singular value decomposition (SVD) is used to generate a compact illumination subspace given arbitrary shape parameters from a parametric 3D face model.

Using a fitting procedure based on minimizing the distance of the input image to the dynamically changing illumination subspace, a shape-specific illumination subspace is reconstructed from a single photograph. The reconstructed illumination subspace is used for face recognition.

DETAILED DESCRIPTION OF THE PREFERRED EMBODIMENT

Figure 1:
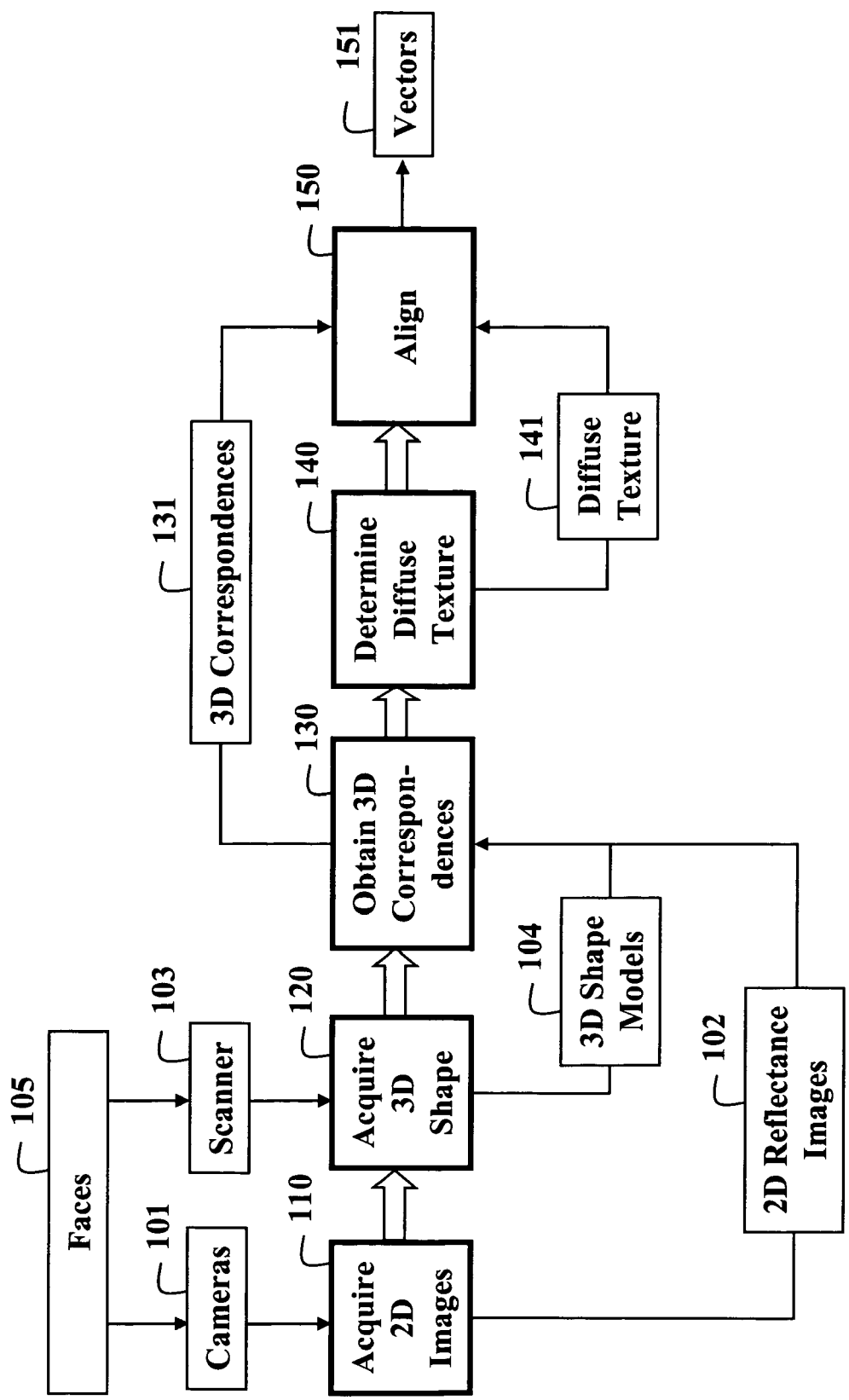
FIG. 1 is a flow diagram of a method for generating bilinear models for faces.
Figure 2:
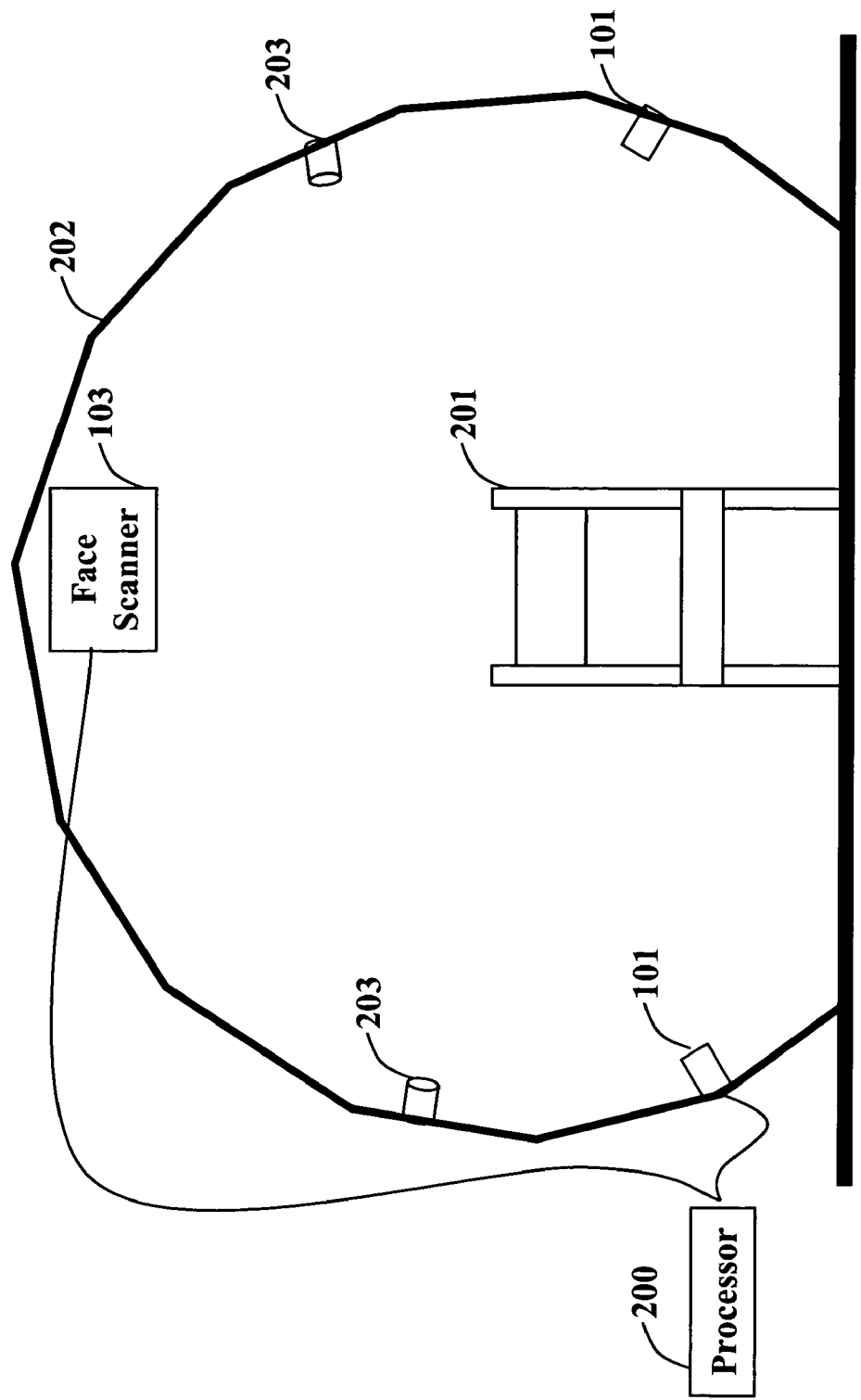
FIG. 2 is a block diagram of a system for acquiring shape and image data of faces.

FIGS. 1 and 2 show a method and system for generating a bilinear illumination model for faces according to one embodiment of our invention. Multiple cameras 101 acquire 110 a large number of 2D reflectance images 102 of faces 105. For each face, multiple images are acquired of the face with varying poses or viewpoints, and varying directional illumination. For each face, a scanner 103 acquires 120 a 3D shape 104 of the face.

As shown in FIG. 2, persons sit on a chair 201 inside a tubular frame in the form of a geodesic dome 202. Digital cameras 101 are mounted on the frame and are aimed at the face from various viewpoints. The dome also includes directional light sources 203. We use 16 cameras and 150 light LEDs mounted semi-spherically on the dome 202 facing the chair 201. The output of the cameras 101 and scanner 103 are connected to a processor 200, which processes the images and 3D shape data.

During operation, the system sequentially turns each light on while simultaneously acquiring 110 the 2D images 102 with the cameras 101. We can also acquire high-dynamic range (HDR) images by repeating the acquisition sequence with different exposure settings.

The face-scanner 103 mounted in the dome includes two structured light projectors and four cameras. The output of the scanner is a polygon mesh containing about 40,000 triangles. The mesh resolves features as small as 1 mm. The mesh is cropping to remove non-facial areas and degenerate triangles.

Then, the mesh is refined using loop-subdivision, Loop, "Smooth Subdivision Surfaces based on Triangles," Master's thesis, Department of Mathematics, University of Utah, 1987. This results in a high-resolution mesh with 500,000 to 1 million vertices. The subdivision implicitly removes noise.

We convert the high-resolution mesh to an unstructured list of point samples, i.e., surfels without connectivity, U.S. Pat. No. 6,342,886 issued to Pfister et al. on Jan. 29, 2002, "Method for interactively modeling graphical objects with linked and unlinked surface elements," incorporated herein by reference. Each surfel stores the necessary information for image reconstruction using EWA splatting, Zwicker et al. 2002.

Intrinsic and extrinsic parameters of all cameras are calibrated and the 3D points of a face are projected to corresponding 2D points in each image 102 through a 3D-2D registration process.

Bilinear Illumination Model

We first obtain 130 3D point-to-point correspondences 131 for all faces 105 using the images and 3D shape. Illumination samples, i.e., pixel intensities, from each reflectance image 102 are projected from the 3D sample points on the face, yielding registered 2D samples which are thereby aligned with the 3D shape 104.

We also determine 140 a diffuse texture 141 for each face from all images for the face. Assuming that facial texture is not coupled with the shape and reflectance, we factor out diffuse texture from the illumination samples according to:

$$w_k = \hat{t}_k / t_k, \text{ for } k=1,\ldots,N$$

where the vector $\hat{t}_k$ is an illumination sample, $t_k$ is the diffuse texture at a 3D point $p_k$ in the mesh with N points. A texture-free illumination component is w, which is different from just reflectance because the component also includes cast shadows. In our notation, the vector symbol "^" and the estimation symbol "~" above the variables are sometimes omitted. Variables in bold are generally vectors and matrices.

As the result for each face, we have the 3D shape points (x, y, z) of the face 105, and texture-free illumination components (w) for each lighting condition (j) from a specific viewpoint or pose.

Figure 3:
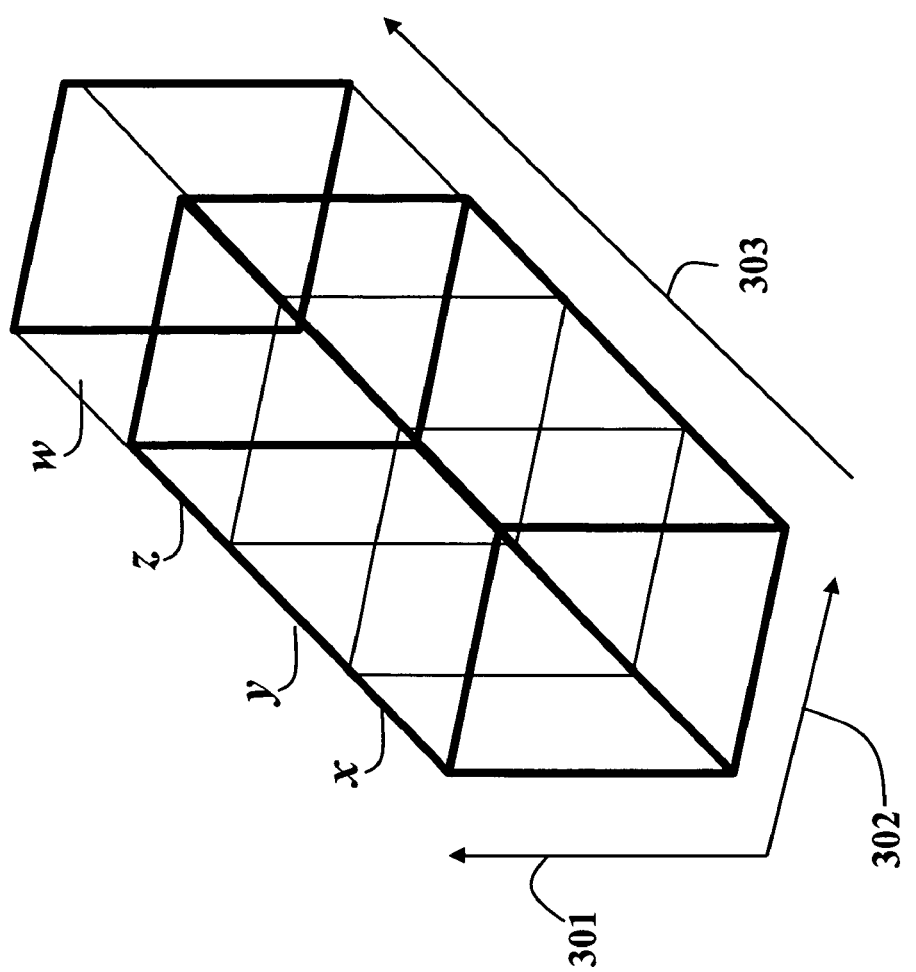
FIG. 3 is a block diagram of aligned shape points and texture components as vectors.

As shown in FIG. 3, we align 150 the 3D point-to-point correspondences (x, y, z) and texture components w for all faces into vectors 151:

$$a_{i,j} = (x_1, \ldots, x_N, y_1, \ldots, y_N, z_1, \ldots, z_N, w_1, \ldots, w_N).$$

along intensity 301, illumination 302, and shape 303 axes. As shown in FIG. 3, we align 150 the 3D point-to-point correspondences (x, y, z) and texture components w for all faces into vectors 151:

$$a_{i,j} = (x1,\ldots,xN, y1,\ldots,yN, z1,\ldots,zN, w1,\ldots,wN).$$

along axes for intensity 301, lighting condition 302, and shape 303 axes and texture-free illumination components.

Figure 4:
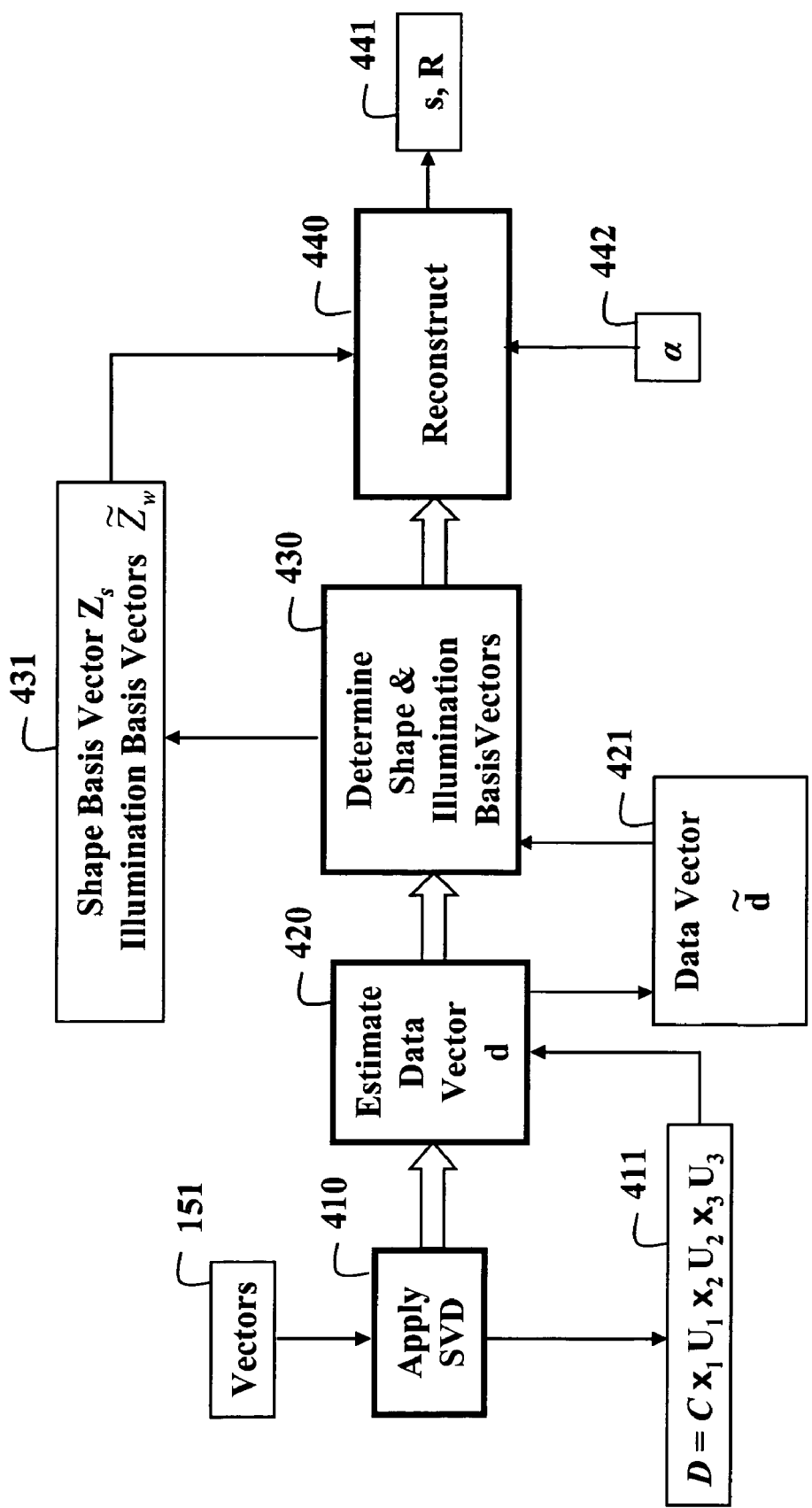
FIG. 4 is flow diagram of generating a bilinear model from the vectors of FIG. 3.

As shown in FIG. 4, we then apply 410 a three-mode, higher order singular value decomposition (SVD) to the vectors 151 to determine a joint variation of both shape and illumination. The resulting data array is a tensor D 411 expressed as a product:

$$D = C \times_1 U_1 \times_2 U_3 \times_3 U_3,$$

where mode matrices $U_1$, $U_2$, and $U_3$ represent the variation along the shape, illumination, and data axes, respectively. The core tensor C governs the interaction between the mode matrices. For details on the mode k product operator $\times_k$, see L. D. Lathauwer, B. D. Moor, and J. Vandewalle, "A Multilinear Singular Value Decomposition," SIAM Journal of Matrix Analysis and Applications, vol. 21, no. 4, 2000.

Using the associative property of the mode-k product, the mode matrix $U_3$ can be incorporated into $Z = C \times_3 U_3$, resulting in a simplified, 2-mode equation:

$$D = Z \times_1 U_1 \times_2 U_2.$$

Next, we determine 430 shape and illumination basis vectors 431 as follows. To obtain a more compact representation, we delete or truncate the highest-order singular vectors and retain a reduced lower-dimensional subspace.

To exploit the redundancy of shape data, i.e., the (x, y, z) tuples along the illumination axis 302, we partition the estimate core tensor $\tilde{Z}$ into two parts. Thus, a data vector $\hat{d}$ 421, with $i^{th}$ shape and $j^{th}$ lighting condition, is estimated 420 by:

$$\hat{d}_{i,j} = (\tilde{\mathbf{Z}}_{xyz} \times_1 \tilde{u}_1^i \times_2 \tilde{u}_2^j, \tilde{\mathbf{Z}}_w \times_1 \tilde{u}_1^i \times_2 \tilde{u}_2^j) \quad (1)$$

Because the underlying shape 104 is independent of lighting condition (j), we predetermine the estimate $\tilde{Z}_{xyz} \times_2 u_2^j$ for any j, remove a singleton dimension, and obtain the shape basis row vectors $Z_s$. Also, shape-specific illumination bases $R_i$ are obtained by estimating $\tilde{Z}_w \times_1 u_1^i$ and removing a singleton dimension. Thus, Equation 1 becomes:

$$\hat{d}_{i,j} = (\tilde{u}_1^i Z_s, \tilde{u}_2^j R_i), \quad (2)$$

where the estimates of $\hat{u}_1^i$ and $\hat{u}_2^j$ are shape and illumination coefficients of $\hat{d}_{i,j}$, respectively.

Using the shape and illumination basis vectors $Z_s$ and $\tilde{Z}_w$ 431, and a linear combination of shape parameter $\alpha$ 442, we can reconstruct 440 corresponding shape and illumination bases 441 as following:

$$s = \alpha Z_s; \quad (3)$$

$$R = \tilde{Z}_w \times_1 \alpha; \quad (4)$$

$$\alpha = \sum_i \alpha_i \hat{u}_1^i, \quad (5)$$

where s is a shape vector (x, y, z) and the rows of R are the illumination basis vectors for a specific shape parameter α 442.

Although the shape parameter α can be described by Equation 5, there are cases when an arbitrary shape s can be supplied from an external source, other than the 3D shape 104. In such a case, we can fit the shape s to find a closest shape parameter α for our shape by solving the following linear system:

$$\hat{s} = \hat{\alpha} Z_s. \qquad (6)$$

We use this technique to estimate an illumination subspace from a generic external shape, such as a morphable model, as described below.

Comparison with Nine Spherical Harmonics

Generating our bilinear illumination model 441 with data acquired from one near-frontal camera viewpoint, we determine how well the subspace for this bilinear illumination model can reconstruct the original data. We also compare our accuracy to that obtained by using nine spherical harmonics as basis images, see Basri et al., above.

Because we have ground truth for the 3D shape and illumination samples from multiple lighting conditions and viewpoints for many faces, we measure a reconstruction error from different numbers of bases for each method.

For each face i, we have a 3D shape $s_i$, diffuse texture $t_i$, and illumination samples $\hat{t}_{i,j,k}$, for all lighting conditions j and camera viewpoints k. Some of the illumination samples are unavailable for each viewpoint due to occlusion. Therefore, we use the notation $\tilde{t}$ for any vector that includes only valid samples.

Given the vectors s and $\tilde{t}$ and omitting the indices, we first determine the illumination bases R using our method and then using the nine harmonic images. Then, the diffuse texture t is multiplied by each column of the matrix $R^T$ in an element wise manner. This constructs texture-weighted illumination bases B, and a reconstruction error for $\tilde{t}$ is:

$$\text{error} = \|\tilde{t} - \hat{B}\hat{B}^T \tilde{t}\|, \qquad (7)$$

where $\hat{B}$ is a QR decomposition of $\tilde{B}$, which contains only the valid rows of B corresponding to $\tilde{t}$. We determine the reconstruction errors for all combinations of subjects, lighting conditions, camera viewpoints, and the number of bases used for reconstruction for each method to generate an illumination subspace.

Figure 5:
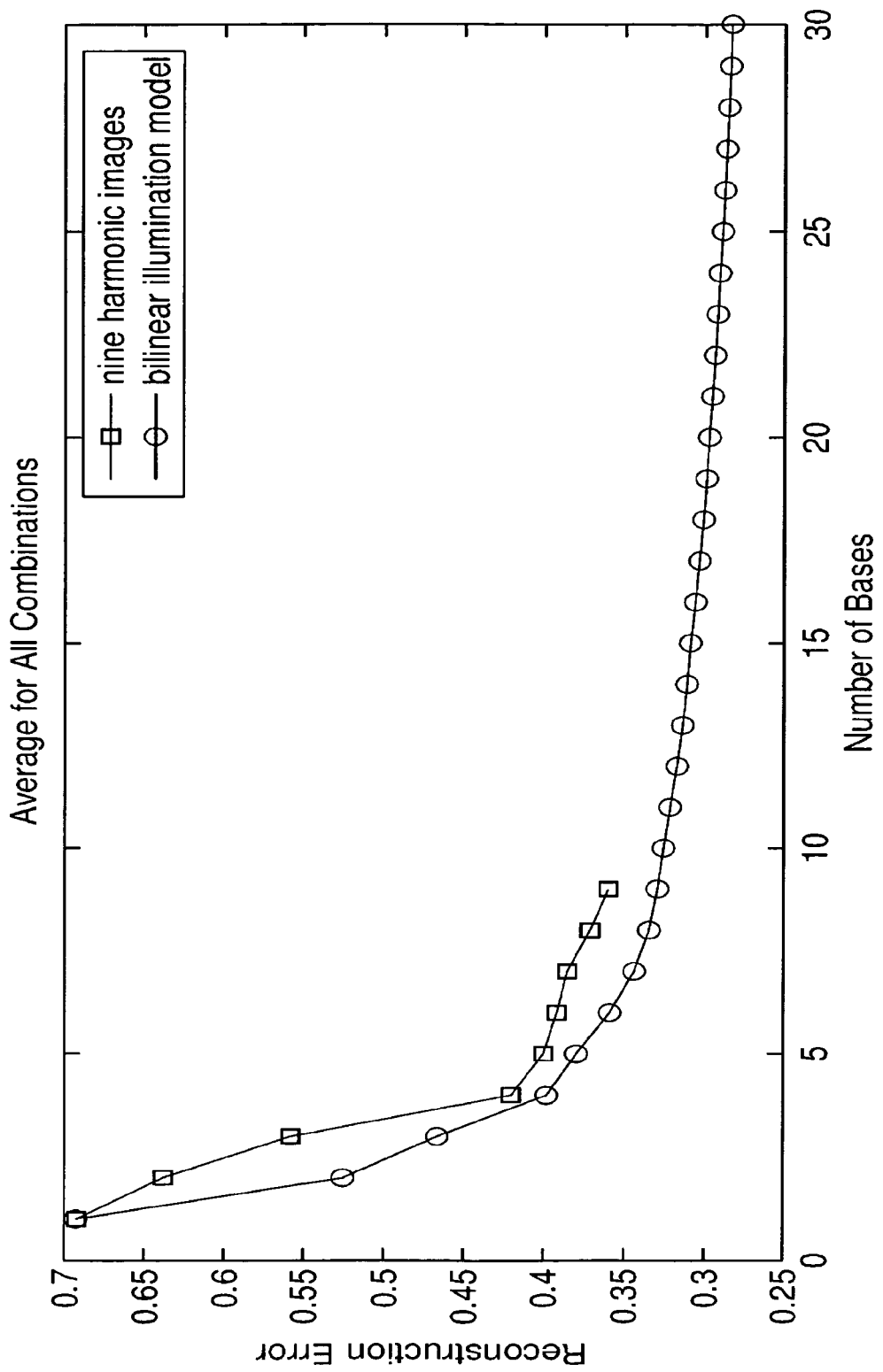
FIG. 5 is a graph comparing reconstruction errors for a different number of bases.
Figure 6:
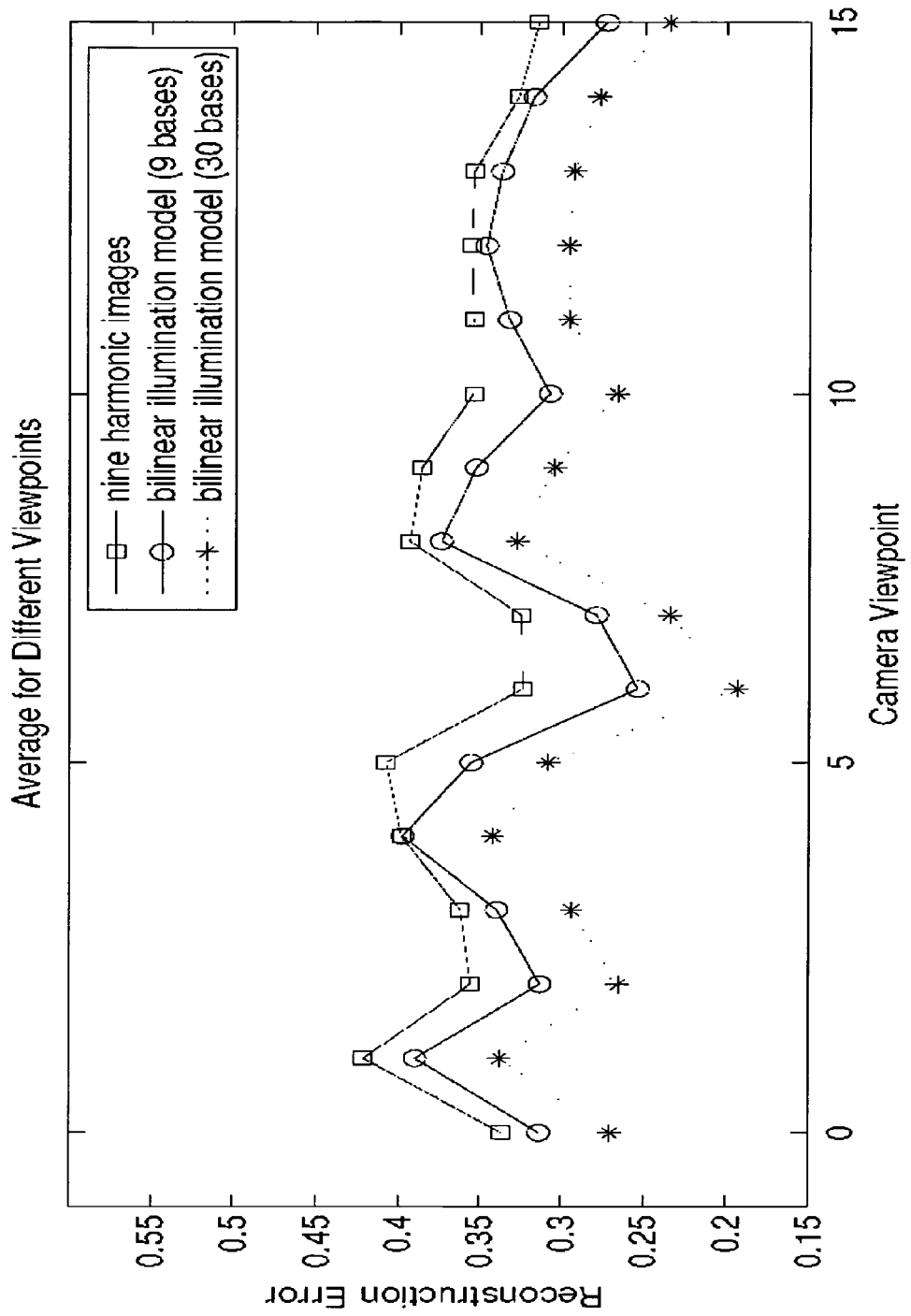
FIG. 6 is a graph comparing reconstruction errors for a different number of camera viewpoints.

FIG. 5 compares the reconstruction error for a different number of bases and FIG. 6 compares the reconstruction error for a different number of camera viewpoints.

Estimation from a Single Image

We now describe how to obtain a face-specific illumination subspace, i.e., illumination bases, given a single input image of a face. The illumination bases are derived from our bilinear illumination model after fitting a morphable model to the input image. This is achieved by projecting three-dimensional shape of the fitted model and texture extracted from the input image into a bilinear illumination model to produce the face-specific illumination bases.

Shape-Specific Illumination Subspace

We construct a vector s for each facial shape, and a vector t for each corresponding texture. We perform principal component analysis (PCA) on the shape vectors S, and the texture vectors T, separately. Then, arbitrary shape and texture can be reconstructed using the first M eigenvectors and model parameters α and β according to:

$$s = \overline{S} + \sum_{i=1}^{M} \alpha_i e_i^s, \qquad (8)$$

$$t = \overline{T} + \sum_{i=1}^{M} \beta_i e_i^t,$$

where the average shape is $\overline{S}$, the average texture is $\overline{T}$, the $i^{th}$ eigenvector for the shape is $e_i^s$, and the eigenvector for texture is $e_i^t$.

The optimization parameters include α, β, and γ. The parameter γ is a 6-dimensional pose parameter, three for translation and three for rotation. During each iteration, we generate shape (s) and diffuse texture (t) from the parameters α and β, and γ. We also extract texture $\hat{t}$ by projecting s to the input image for a given pose γ. The optimal parameters are found by minimizing an error function similar to Equation 7.

Instead of the texture vector $\hat{t}$, we use the estimated texture $\tilde{t}$, which contains only the visible points in the extracted texture. We solve the following optimization using a downhill simplex method.

$$\underset{\alpha,\beta,\gamma}{\operatorname{argmin}} \|\tilde{t} - \hat{B}\hat{B}^T \tilde{t}\|, \qquad (9)$$

The well-known downhill simplex method is a non-linear optimization process that can evaluate cost functions without determining gradients.

Because our model uses an adaptive illumination subspace during optimization, the final reconstructed shape and texture need not be the same for both methods. While the shape, texture and pose parameters estimated by this optimization framework are important in reconstruction, we are mainly concerned with optimal characterization of illumination bases $B_{opt}$. These bases span the illumination subspace of the person with the shape $s(\alpha_{opt})$ and the diffuse texture $t(\beta_{opt})$.

However, the synthesized texture cannot capture all the details of a face in the original input image. For the purpose of face recognition, it is important to obtain the real-texture weighted illumination bases.

We use the following notation in subsequent discussion:
$t_s$: synthesized diffuse texture (known)
$\hat{t}_s$: synthesized illuminated texture (known)
$t_r$: real diffuse texture (unknown)
$\hat{t}_r$: real illuminated texture (known)
define A ⊗ b, A ⊘ b as element-wise multiplication (division) of vector b with all column vectors of A In each iteration, illumination bases are first determined by:

$$B = R \otimes t_s, \qquad (10)$$

and new bases are obtained by replacing $t_s$ with $t_r$ such as:

$$B^* = B \oslash t_s \otimes t_r. \qquad (11)$$

Assuming that our estimated illumination approximates the original illumination, we obtain:

$$t_r \approx \hat{t}_r \oslash \hat{t}_s. \qquad (12)$$

Finally, substituting Eq. 12 into Eq. 11 yields:

$$B^* \approx B \otimes \hat{t}_r \oslash \hat{t}_s. \qquad (13)$$

Illumination Bases for Face Recognition

Figure 7:
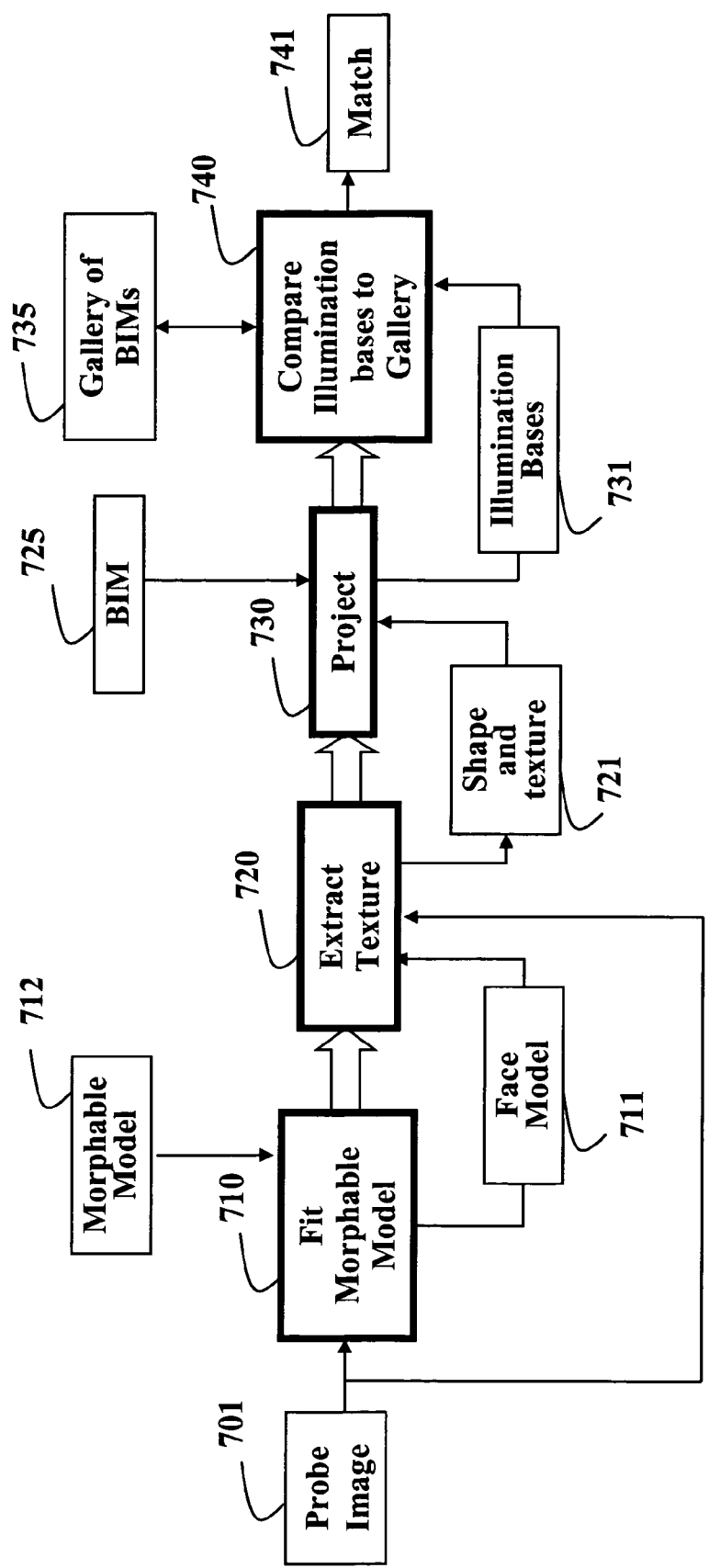
FIG. 7 is a flow diagram of recognizing a face in an input image using bilinear illumination models.

FIG. 7 shows a method 700 for recognizing a face in an input probe image 701 according to the invention. The probe image is fitted 710 with a morphable model 712 to construct a three-dimensional model 711 of the face in the probe image 701, the three dimensional model having shape and pose parameters. Texture is extracted 720 from the probe image 701 using the three-dimensional model by projecting three-dimensional shape s to the input image for a given pose y. The three-dimensional shape and extracted texture 721 are projected 730 into a bilinear illumination model (BIM) 725 to generate real-texture weighted illumination bases 731 for the face in the probe image. The illumination bases 731 are compared 740 to illumination bases of each of a gallery 735 of bilinear illumination models of known faces to identify a match 741 to the face in the input image. The match 741 is a known face corresponding to a bilinear illumination model from the gallery having illumination bases that have a minimum distance to the illumination bases 731 of the face in the probe image. Optionally, the projected three-dimensional shape can also be compared to reconstructed shape of each of the bilinear illumination models of known faces in the gallery to identify the face in the probe image.

Although illumination bases in a common vector space are useful for pose-invariant face recognition, they have one disadvantage. Since all the extracted textures are registered in a shape-free vector space, we lose all shape information for matching. It is generally accepted that texture is an important identity cue, but 3D shape is increasingly important under extreme lighting conditions.

In the majority of face recognition systems, probe and gallery images are often aligned using only the eye locations, with other facial areas transformed accordingly. Shape information is exploited either implicitly or explicitly. Therefore, it is often more practical to have illumination bases in the 2D image space as opposed to in a shape-free 3D space.

First the bases registered with a 3D shape are divided by the corresponding reconstructed illumination samples (B ¢ $t_s$) and projected to an image plane where image fitting is performed. The projected image data is densely computed using push-pull interpolation in the image plane and multiplied by the original image. This procedure is performed for each reconstructed basis.

EFFECT OF THE INVENTION

We propose a novel method for constructing an illumination subspace by extracting 3D shape from a single image. To deal with the complex reflectance properties of human faces, we exploite a compact illumination model derived from the joint statistics of 3D surface points and precisely registered illumination samples under varied lighting conditions. The experimental results show that this model has better reconstruction and recognition performance than related analytic models. Moreover, it has good extrapolation across pose. With the Yale Face Database B, our method was (at the very least) comparable to the prior art despite the much simpler computation for obtaining an illumination-invariant face representation from a single image. Finally, our method performs pose-invariant recognition using reconstructed illumination bases that are registered with the recovered 3D shape.

It is to be understood that various other adaptations and modifications may be made within the spirit and scope of the invention. Therefore, it is the object of the appended claims to cover all such variations and modifications as come within the true spirit and scope of the invention.

The invention claimed is:

1. A method for recognizing an unknown face in an image, comprising a processor for performing steps of the method, comprising the steps of:
    fitting a morphable model having shape and pose parameters to an unknown face in an image to construct a three-dimensional model of the face;
    extracting texture from the unknown face in the image using the three-dimensional model;
    projecting the shape and texture into a bilinear illumination model to generate illumination bases for the unknown face in the image; and
    comparing the illumination bases for the unknown face in the image to illumination bases of each of a plurality of bilinear illumination models of known faces to identify the unknown face in the image.

2. The method of claim 1, in which the fitting, extracting, projecting, and comparing steps are performed on a plurality of images of the unknown face.

3. The method of claim 2, in which the plurality of images are acquired with varying poses of the unknown face, varying exposure, varying viewpoints, and varying directional illumination.

4. The method of claim 2, in which the plurality of images are high-dynamic range images.

5. The method of claim 1, further comprising:
    scanning the unknown face to obtain a polygon mesh corresponding to a shape of the unknown face.

6. The method of claim 5, further comprising:
    converting the polygon mesh to an unstructured list of point samples.

7. The method of claim 1, in which the bases are obtained by a singular value decomposition.

* * * * *